June 20, 1933.  C. COSGROVE  1,915,184
MANUFACTURE OF WIRE MESH AND THE LIKE FOR CONCRETE
REENFORCEMENT AND OTHER PURPOSES
Filed Nov. 3, 1931  6 Sheets-Sheet 1

Inventor:
Claude Cosgrove
By
Attorney.

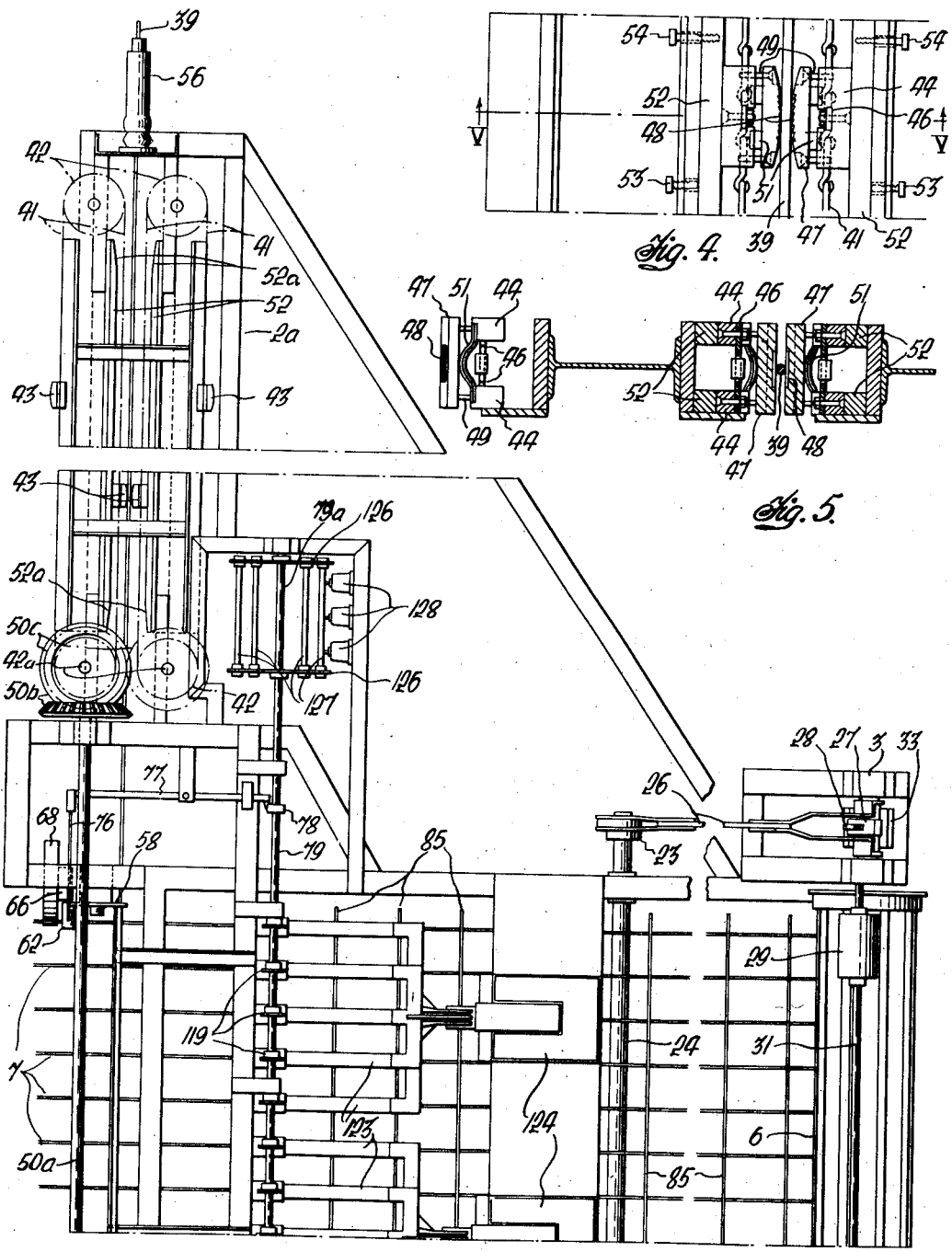

Inventor:
Claude Cosgrove

June 20, 1933.  C. COSGROVE  1,915,184
MANUFACTURE OF WIRE MESH AND THE LIKE FOR CONCRETE
REENFORCEMENT AND OTHER PURPOSES
Filed Nov. 3, 1931  6 Sheets-Sheet 5
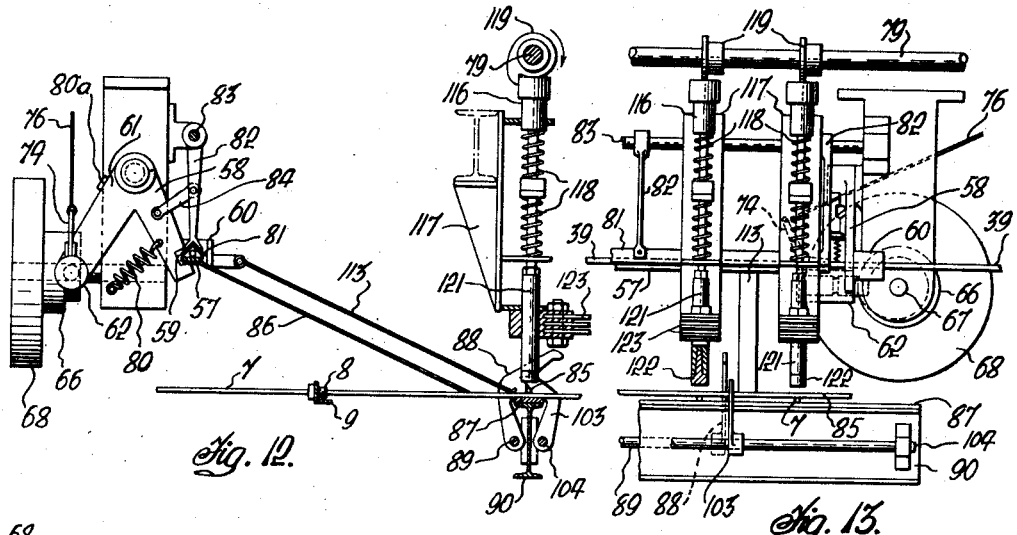
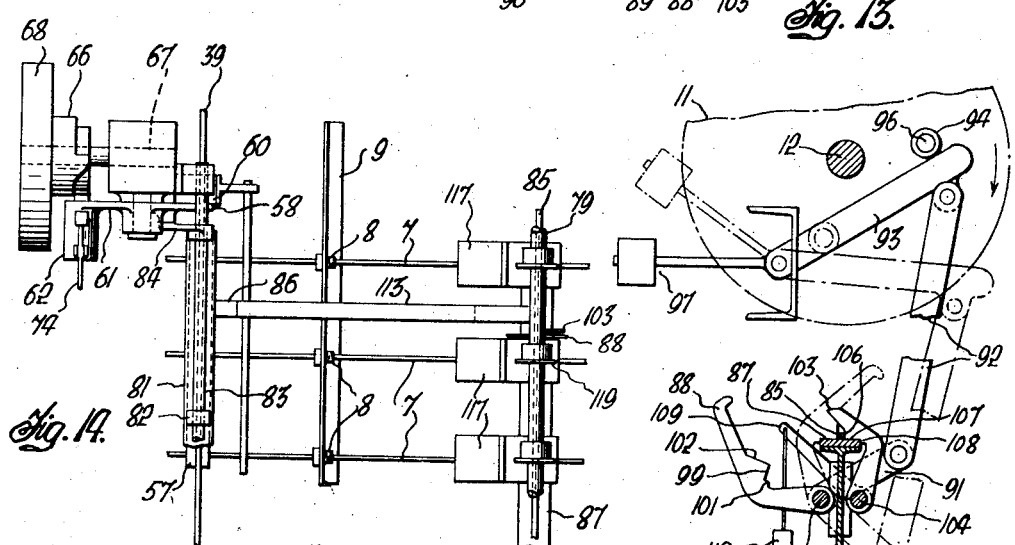
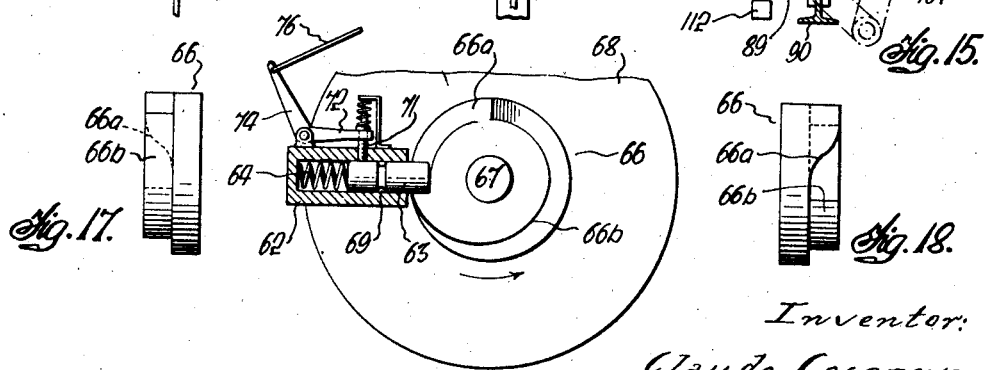
Inventor:
Claude Cosgrove
By [signature]
Attorney Inventor:
Claude Cosgrove
By _____
Attorney Patented June 20, 1933

1,915,184

UNITED STATES PATENT OFFICE

CLAUDE COSGROVE, OF MIDDLE PARK, MELBOURNE, VICTORIA, AUSTRALIA, ASSIGNOR TO HUME STEEL LIMITED, OF MELBOURNE, AUSTRALIA, A COMPANY OF VICTORIA, AUSTRALIA

MANUFACTURE OF WIRE MESH AND THE LIKE FOR CONCRETE REENFORCEMENT AND OTHER PURPOSES

Application filed November 3, 1931, Serial No. 572,867, and in Australia May 27, 1931.

This invention relates to the manufacture of wire mesh and the like which is particularly adapted for the reenforcement of concrete roadways and other bodies but may also be used for other purposes.

The primary object of the invention is to provide improved apparatus for manufacturing such mesh or the like from metal wires or rods of various diameters whereby the longitudinal and lateral members of the mesh may be positively and effectively welded together under pressure at their junctions.

The invention provides for the various junctions being welded in series and for the application of considerable mechanical pressure to the junctions of the wires or rods during welding thereby facilitating the welding operation and ensuring an effective bond.

The invention also provides for a differential or automatically adjustable drive of a feed drum or roller whereby the longitudinal wires and the welded mesh are drawn through the machine at a constant rate, notwithstanding the gradual increase in the diameter of the roll of mesh received on said feed drum.

According to a modification of the feeding means the completed mesh may be delivered from the machine in a flat condition by the employment of a frame with grippers or brush members, this frame receiving a substantially rectangular motion whereby the mesh is engaged by the brush members on the forward stroke and carried forwardly whereupon the frame is raised to clear the brushes from the mesh, then moved rearwardly and at the end of the rearward stroke lowered to again bring the brushes into engagement with the mesh for the next forward or feeding stroke.

In accordance with the invention the longitudinal wires or members to form the mesh are drawn from supply spools or the like which may be suitably braked to maintain the desired tension, these longitudinal wires being passed, if desired, through a suitable sand blast device adapted to operate intermittently at spaced intervals on the wires and thus clean the portions thereof to be welded. The longitudinal members then pass through suitable guides which are spaced laterally across the welding machine in accordance with requirements, and then over a laterally extending contact plate which is rigidly supported beneath welding electrodes which are arranged in longitudinal alignment with said guides. The forward ends of the longitudinals may be connected to a feed drum or the like, which is so operated that it intermittently draws the longitudinals through the machine and winds up the mesh at a constant rate notwithstanding the gradual increase in the size of the finished coil.

Lateral wires or rods are fed onto a cross member supported above and at right angles to the longitudinals at a point in advance of the said guides and behind the welding electrodes by a laterally moving feed mechanism arranged at one side of the welding machine, the lateral members of the desired length being successively severed from the continuous supply wire after they have been fed onto the above cross member from which they are pushed off by a suspended member down inclined members onto the longitudinals whereupon the laterals are carried forward and held above the contact plate by suitable placers, located between the longitudinals, during the welding operations. The completed mesh is then intermittently advanced and wound onto the feed drum as aforesaid.

Referring to the drawings which form part of this specification—

Figure 3 is a plan of the other half of the apparatus.

Figure 4 is an enlarged fragmentary view of means for feeding the lateral wire.

Figure 5 is a cross section on line V—V of Figure 4.

Figure 12 is a side elevation showing means for severing the lateral wire, means for positioning the severed lateral wire upon the longitudinals and means for welding the severed lateral wire to the longitudinals.

Figure 13 is an end view of Figure 12.

Figure 14 is a plan of Figure 12.

Figure 15 is an enlarged view of the mechanism for placing and holding the cut lateral wire in position during the welding operation.

Figure 16 is an enlarged part sectional view of trip mechanism embodied in the means for cutting the lateral wire.

Figures 17 and 18 are side views of the cam member seen in Figure 16.

Figure 1:
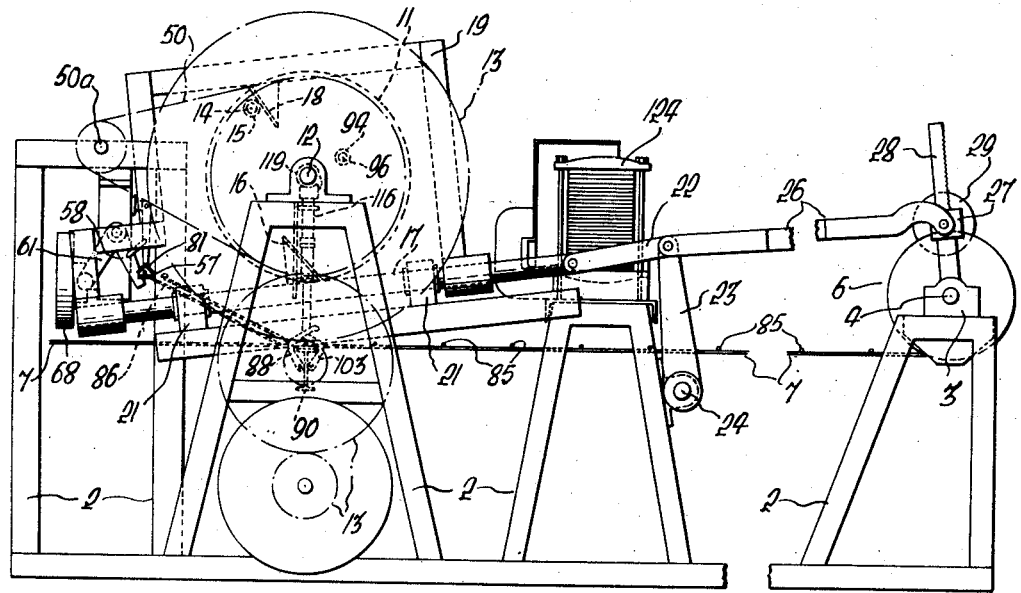
Figure 1 is a side elevation of apparatus in accordance with the invention.
Figure 2:
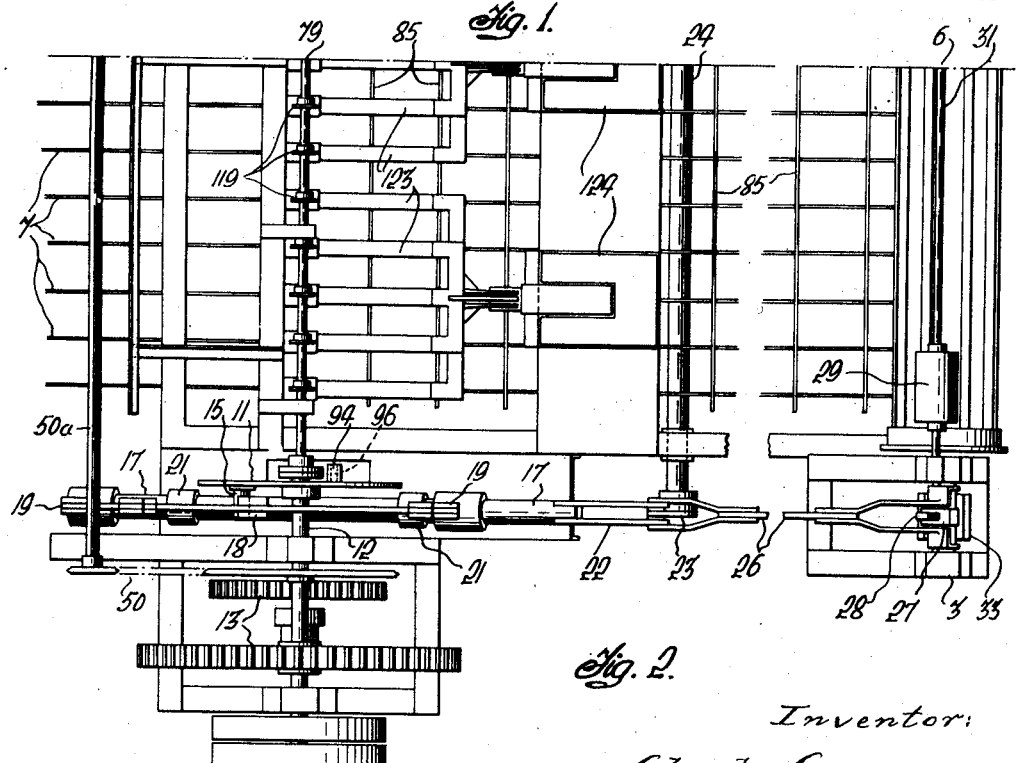
Figure 2 is a plan of one half of the apparatus.
Figure 6:
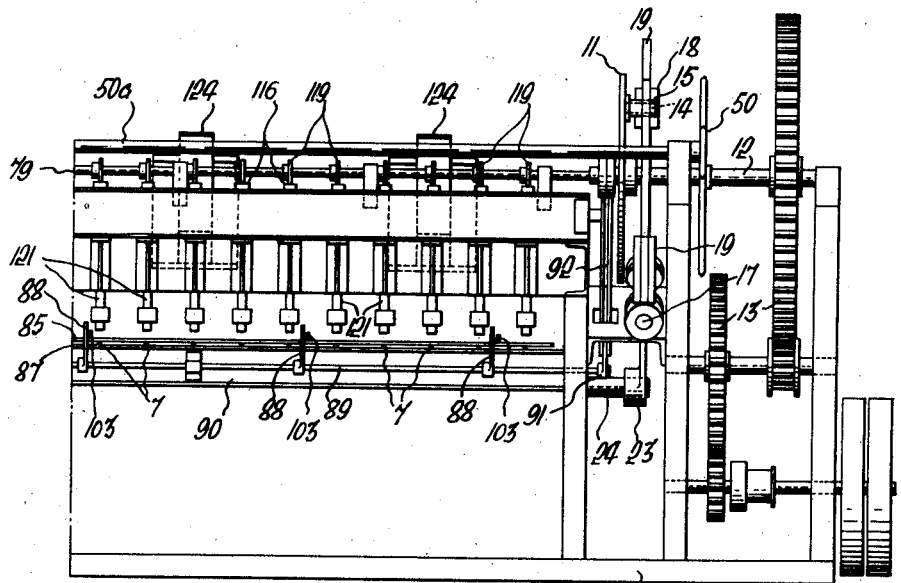
Figure 6 is an end view of one half of the apparatus, looking at the rear thereof.
Figure 7:
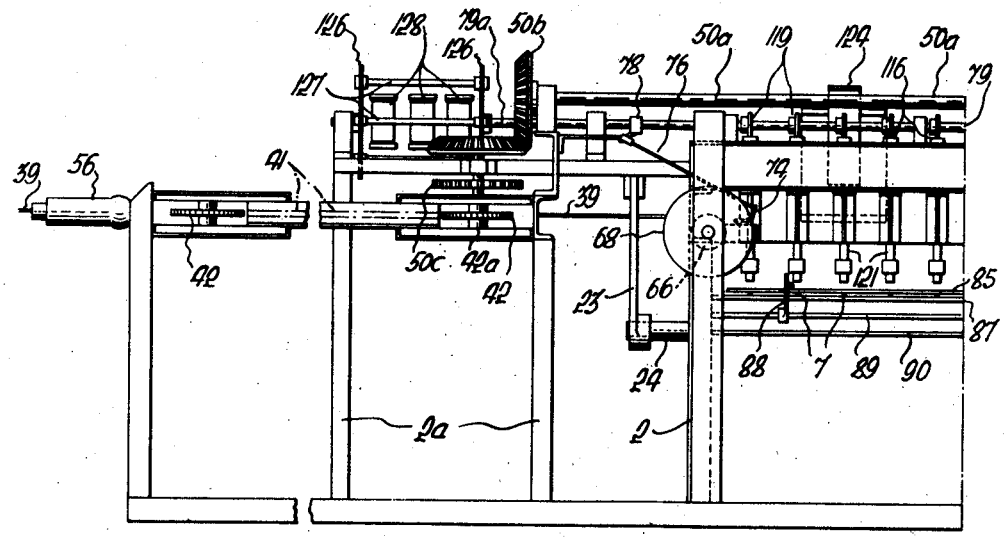
Figure 7 is an end view of the other half of the apparatus.

Apparatus in accordance with a practical embodiment of the invention comprises a suitable framework 2 at the forward end of which are bearings 3 supporting stub shafts 4 of a feed drum 6 to which the leading ends of the longitudinal wires or rods 7 are suitably connected at the commencement of operations. The longitudinals which may be led from spools (not shown) disposed at the rear of the apparatus are passed through guides such as externally threaded sleeves 8 detachably applied to a cross bar 9 (Figures 12 and 14) whereby the sleeves may be interchanged to suit longitudinal wires or rods of different diameters.

Means for intermittently operating the feed drum 6 may comprise a disc 11 on a shaft 12 driven through suitable reduction gearing 13 from a source of power. The disc 11 carries a crank pin 14 surrounded by a roller 15 which is adapted to intermittently strike two abutments, one of which 16 may be carried by a sliding shaft 17 arranged lengthwise of the machine below shaft 12, whilst the other abutment 18 may be carried upon the upper part of a yoke or frame 19 attached to the sliding shaft 17 and extending above shaft 12. By this means the sliding shaft may be intermittently reciprocated in suitable bearings 21 on the framework.

Figure 8:
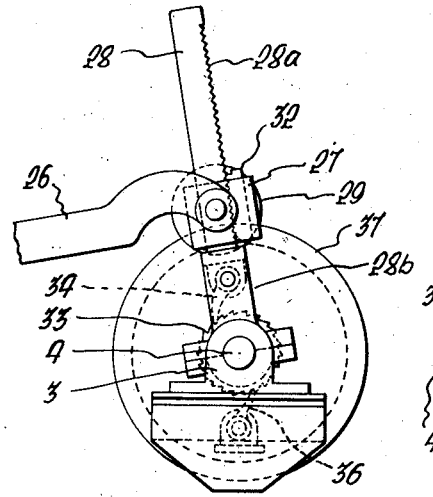
Figure 8 is an enlarged side view of means for feeding the longitudinal wires and coiling the completed mesh upon a drum.
Figure 9:
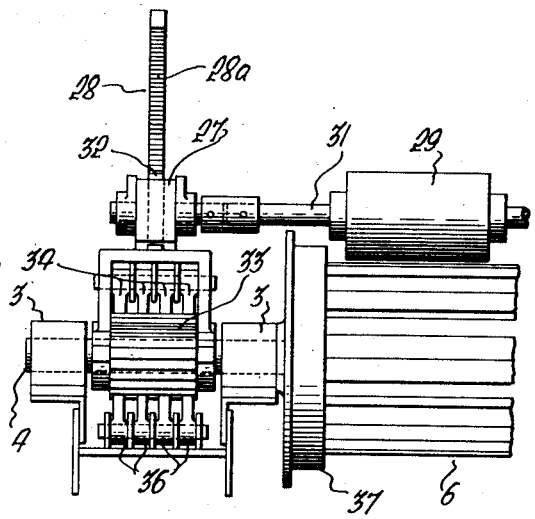
Figure 9 is a fragmentary side view of Figure 8.
Figure 10:
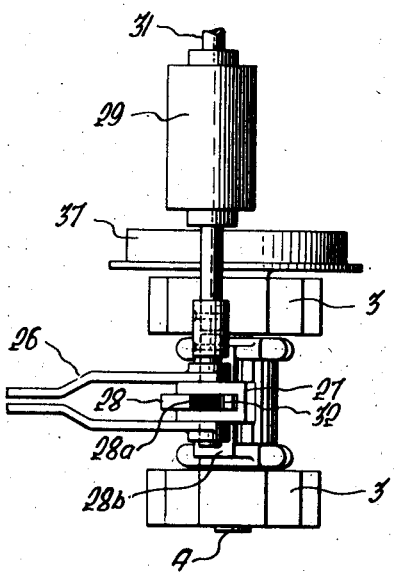
Figure 10 is a plan of Figure 8.

The forward end of the sliding shaft may be connected by means of a link 22 to the outer end of an arm 23 secured to one end of a transverse rocking shaft 24 which is fitted with another arm 23 at its opposite end. Connected to the arms 23 are the rear ends of the connecting rods 26, the forward ends of which are pivoted to hollow blocks or sleeves 27 each of which is automatically adjustable upon a ratchet lever 28 (see Figures 8, 9 and 10). These ratchet levers are operatively connected to the feed drum 6 by suitable pawl and ratchet gear hereinafter referred to whereby the feed drum may be intermittently advanced in accordance with the reciprocating movements of the sliding shaft 17.

In order to ensure a uniform rate of feed or advancement of the longitudinals and the welded mesh the position of the blocks 27 on the ratchet levers 28 is automatically adjusted so that as the diameter of the coil of mesh on drum 6 increases, the forward ends of the connecting rods 26 will be automatically moved outwards along the ratchet levers to thereby progressively and proportionately decrease the intermittent forward angular movements of the drum. For this purpose idle rollers 29 may be mounted upon a transverse spindle 31 above the drum, these rollers being adapted to engage the periphery of the coil of mesh on said drum and the ends of spindle 31 being coupled to the blocks 27. These blocks may be fitted with serrated plates 32 which are yieldingly pressed into engagement with corresponding serrated faces 28a of the respective ratchet levers.

By the abovementioned means as the diameter of the coil of mesh on the feed drum increases, the rollers 29 are automatically forced so that the blocks 27 are moved outwardly along the ratchet levers thus automatically adjusting the position of the forward ends of the connecting rods 26 to increase the effective length of the ratchet levers so that for a constant movement of the sliding shaft 17 and the connecting rods 26 the extent of the intermittent forward movements of the feed drum will progressively decrease as the size of the coil of mesh thereon increases. The desired uniform rate of feed is thus ensured. The serrated plates 32 prevent the forward ends of the connecting rods 26 from inadvertently slipping along the ratchet levers 28.

Figure 11:
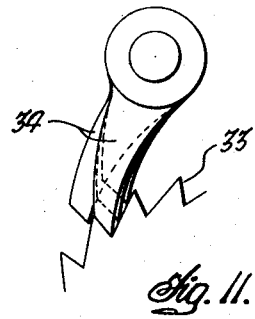
Figure 11 is an enlarged view showing a set of pawls embodied in the pawl and ratchet mechanism of Figures 8 to 10.

Each pawl and ratchet gear may comprise a ratchet wheel 33 fast on shaft 4 between the forked inner end 28b of the respective ratchet lever which is free on the shaft. There is preferably a set of spring pressed actuating pawls 34 mounted in the forked end of the ratchet lever, these pawls being of different lengths as indicated in Figure 11 so as to minimize the possibility of lost motion between the ratchet lever and the ratchet wheel. A similar effect may be obtained by employing a ratchet wheel having a number of longitudinal sections, the teeth of which are staggered circumferentially. In such case the pawls may be of uniform length.

A similar set of holding pawls 36 may be mounted on the framework 2 in order to maintain the longitudinals 7 and the uncoiled mesh in tension and prevent reverse movement of the drum while the actuating pawls 34 are riding backwardly over the ratchet wheel 33.

The feed drum 6 is preferably of a collapsible nature and detachably connected at its ends to end plates or rings 37 to which the shafts 4 are fast, to permit of ready removal of the coil of mesh from the drum.

The mechanism for feeding the lateral wire 39 into position on the longitudinals preferably comprises a pair of laterally disposed endless feed chains 41 mounted on a suitable lateral extension 2a of the framework 2 at one side of the machine. These feed chains extend around sprockets 42 mounted on vertical spindles 42a and carry co-operating grippers 43 which track along guide bars 52 and grip the lateral wire as it passes from a supply spool (not shown) between the feed chains.

A suitable construction for these grippers is illustrated in Figures 4 and 5, wherein the body of each gripper comprises two cheeks 44 united by a cross member 46 to which the respective chains 41 are connected. A gripping jaw 47 with a serrated gripping face 48 is retained to each body, as by means of pins 49 projecting from the jaw 47 into the cheeks 44, so as to permit the jaw to move towards and away from the body, the pins limiting the outward movement. A spring 51 which may be of the laminated leaf type is provided for each gripper to yieldingly press the jaw thereof outwardly so that the lateral wire will be effectively gripped by the serrated jaws of opposed grippers along the inner stretches of the chains and thus feed the wire towards the longitudinals.

To enable the grippers to grip and feed wires of different diameters the guide bars 52 against which the gripper body cheeks 44 track along the inner stretches of the chains 41 may be adjusted by means of set screws 53 and keeper screws 54 laterally of the framework 2a. The ends of the guide bars 52 may be tapered as at 52a (Figure 3) to enable the grippers to ride onto and off the bars.

The chains 41 may be driven in unison from shaft 12 by chain drive 50, shaft 50a, mitre gears 50b and spur gears 50c on the spindles 42a of the inner sprockets 42.

A suitable wire straightening member 56 may be located between the supply spool or the like and the said feeding mechanism in order to remove any kinks or irregularities in the wire 39 as it is fed to form the lateral members of the mesh.

The lateral wire is fed onto a cross member 57 extending at right angles over the top of the longitudinals 7 (see Figures 12, 13 and 14) and when the desired length of the lateral wire has been fed it is automatically severed from the continuous supply wire. The wire cutting mechanism may be of any suitable form, but as illustrated comprises a pivoted arm 58 having a cutter 59 and adapted to swing across a lateral guide aperture of a block 60 through which the lateral wire is fed, to thereby sever the wire.

The cutter may have a second arm 61 terminating in a hollow boss 62 (see Figures 16, 17 and 18) housing a plunger 63 which is yieldingly projected by a spring 64 out of the open end of the cylinder so as to co-operate with a cam member 66 mounted on a shaft 67 having a pulley 68 to receive a driving belt (not shown).

The cam member has two cam faces, face 66a acting sidewise on the projected end of the plunger so as to move the cutter on its cutting stroke, face 66b acting endwise on the plunger so as to force it back into the cylinder 62 at the completion of the cutting action.

To normally hold the plunger 63 in inoperative position it may have a circumferential groove 69 engageable by a spring pressed locking pin 71 carried by arm 72 of a lever which has another arm 74 connected by an operating rod 76 with an intermediately pivoted arm 77 (see Figure 3) actuated by a cam 78 on a cam shaft 79 which extends laterally above the framework and may be coupled to shaft 12 or consist of an extension thereof.

It will thus be evident that the plunger 63 is released once during every rotation of shaft 79 from the locking pin 71 and automatically projected into engagement with cam face 66a which effects the active stroke of the cutter after which the plunger is reset by cam face 66b and locked by pin 71. The cutter may be returned to normal position by a spring 80 which holds arm 61 against a stop 80a (Figure 12) pending the next cutting operation.

After each successive length of lateral wire has been fed across the longitudinals and severed as above-mentioned, it is swept off the cross member 57 by a thrower device (Figures 12, 13 and 14) which may comprise a V section bar 81 which extends with its mouth directed downwardly over the cross member 57. The thrower bar 81 is suspended by one or more arms 82 from a transverse spindle 83, one of these arms being connected by a link 84 with the pivoted cutter 58 so that immediately after the cutter has severed the lateral wire the cut length is swept off the cross member.

The cut lateral wire 85 then slides down ramps 86 onto the longitudinals 7 and is then moved forwardly and held in position intersecting the longitudinals where they rest upon the upper surface of a copper or other suitable contact plate 87 rigidly supported as by a cross beam 90 and extending transversely of the machine in alignment beneath a row of welding electrodes hereinafter referred to.

The placing and holding mechanism for the laterals may comprise a rear set of placer fingers 88 fixed at intervals to a cross spindle 89 supported by bearings at one side of cross beam 90 and adapted to be intermittently rocked at properly timed intervals as by means of an arm 91 and a link 92 connecting the spindle 89 to a pivoted lever 93 disposed in the path of a striker, such as a roller 94 encircling a pin 96, carried by the disc 11 on shaft 12 (see Figure 15). The lever 93 may be counterweighted as at 97 so that normally the rear placer fingers extend rearwardly from their spindle below the cut lateral wire lying upon the longitudinals at the bottom of the ramps.

As the rear placers 88 are swung upwardly and forwardly between the longitudinals they push the lateral 85 forwardly into the welding position. The upper or front edge of each placer 88 may have a right angled projection, one face 99 of which comes to rest upon the upper face of the contact plate 87 and terminates at one end in a step or shoulder 101 which engages the rear edge of the contact plate and thus limits forward swinging of the rear placer. The other face 102 of the right angled projection extends vertically against the rear of the lateral 85.

A set of front placers or stops 103 is mounted at the other side of beam 90 upon a cross spindle 104, each front placer having a right angled projection with a face 106 adapted to engage the front of a severed lateral wire above the contact plate 87, and a face 107 adapted to lie upon the upper surface of the control plate, the face 107 terminating in a step or shoulder 108 adapted to engage the front edge of the contact plate. A lever 109 with a counterweight 112 may be associated with cross spindle 104 to maintain the front placers in their raised or operative positions with sufficient pressure that the lateral wire awaiting welding is firmly held between the pairs of rear and front placers during which stage the feed of the longitudinals is of course arrested. During the next feed motion the lateral wire 85 which is now welded to the longitudinals forces the front placer fingers 103 downwardly and forwardly about the cross spindle 104 sufficiently to enable the lateral wire to travel over the front placers which then return by influence of the counterweighted lever 109 to their normal positions.

One or more bars 113 hinged at their upper ends may extend parallel to and in advance of the ramps 86 in order to restrain excessive forward movement of the laterals after they reach the longitudinals at the bottom of the ramps. These hinged bars are raised by each lateral as it is carried forwards by the rear placers 88.

The means for effecting the welding together of the longitudinals and laterals comprises a row of electrode carrying plungers 116 vertically arranged above the contact plate 87 and spaced laterally of the apparatus in accordance with the spacing of the longitudinal members 7 of the mesh. The plungers are mounted to move vertically in suitable brackets 117 and are controlled by springs 118 which are adapted to normally maintain the plungers in a raised position. The cam shaft 79 before referred to extends transversely above the plungers and carries cams 119 which are adapted to depress the plungers in proper timed relationship against the action of the springs whereby considerable pressure is exerted upon the junctions of the longitudinal and lateral members during the welding operation. The cams 119 are preferably of such form as to allow quick return strokes of the plungers and electrodes.

Each of the said plungers is fitted at its lower part with a copper or other suitable electrode 121 which is preferably provided at its lower end with a renewal tip 122 (Figure 13). The electrodes are electrically connected, preferably by means of suitable laminated conducting strips 123, with transformers 124 which are mounted on the main framework 2, for the supply of electric energy to the electrodes. Any suitable number of such transformers may be employed, the secondaries being connected to groups of the conducting strips 123 which are connected to corresponding groups of electrodes. Where three phase alternating current is available a preferred arrangement is three single phase transformers, one to each phase, with primaries connected in delta and secondaries in star with the neutral point of the secondary circuits connected to the contact plate 87.

The use of an elongated contact plate or member 87 which extends transversely beneath the electrodes and is common to all of the welding circuits as above indicated, obviates the necessity of separate contact members passing down between each adjacent pair of the longitudinals 7 and so allows of much closer spacing of the longitudinals than is obtainable with previous known welding systems.

If desired suitable means, such, for instance, as an inclined slot and a pin engaging same, may be provided to impart a slight rotary movement to each electrode when it descends onto the crossed wires to thus ensure the removal of any dirt or foreign matter therefrom prior to welding.

In order to provide means for automatically switching on and off the current to the electrodes so that they are intermittently energized for the requisite periods during the welding operations, an automatic switch operating device may be provided to operate switches associated with the various groups of electrodes as desired. To this end the cam shaft may be extended laterally as at 79a and fitted with a suitable switch operating device such, for instance, as a pair of discs 126 mounted on the cam shaft extension and having circumferentially spaced bars 127 extending therebetween so that, as the device rotates, these strikers will successively operate switches 128 associated with the various groups of electrodes. The current may be intermittently switched onto the groups of electrodes by the automatic switch device so that an electrode of each group operates simultaneously with the equivalent electrodes of the other groups and the welding current passes successively through adjacent junctions of each group, the corresponding portions of each group being thus simultaneously welded. Preferably the current is switched off just before the respective electrode rises from the crossed wires and the next electrode makes contact so that no electrode moves while in circuit.

Figure 21:
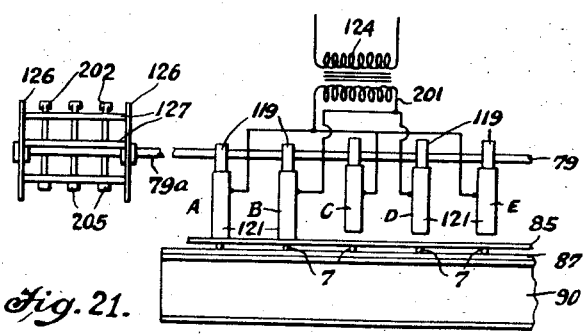
Figures 21 and 22 illustrate diagrammatically the method of welding the intersecting wires.
Figure 22:
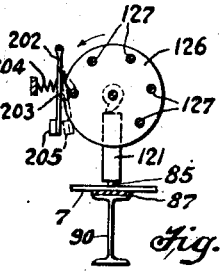

Figures 21 and 22 indicate diagrammatically the method of connecting each group of electrodes 121 to its transformer, and the manner in which the switches 128 are actuated in synchronism with the electrodes. According thereto one side of the secondary 201 of each transformer 124 is connected (as by the aforesaid laminated strips 123) to odd numbered electrodes 121 of the respective group, while the other side of the secondary is connected to even numbered electrodes of the group. This manner of connection provides a current potential between each adjacent pair of the electrodes and when any adjacent pair of electrodes is in contact at the same time with a lateral wire 85, a welding short circuit will be provided through the lateral and longitudinal wires to the contact plate 87.

The method of welding is as follows:—

The first two electrodes (A and B in Figure 21) of each group are depressed simultaneously and the respective switch 128 is closed, thereby completing the welding circuit so that the intersecting wires beneath A and B are simultaneously welded. The switch 128 then opens to break the circuit and immediately afterwards electrode A rises and electrode C descends while electrode B remains in its lowered position. The switch is then closed so that the electrode C forms a weld. The switch 128 is then opened, electrode B rises, electrode D descends and electrode C remains lowered. The switch is again closed so that a weld is formed beneath electrode D after which the switch is opened, electrode C rises and electrode E descends, whereupon the switch is again closed to form a weld beneath electrode E. After the switch is again opened electrodes D and E rise and electrodes A and B descend to commence the cycle which is the same for each group of electrodes and the respective switches.

Synchronization between the movements of the electrodes and the actuation of the switches is obtained by the arrangement of the cams 119 on the shaft 79 and the switch actuating means. As indicated in Figure 22 each switch 128 may have a rocker arm 202 carrying an abutment 203 urged by a spring 204 into the path of the bars 127 extending between the discs 126, the arm carrying a contact member 205 adapted to bridge normally open contacts (not shown) in the welding circuit. In the position shown in Figure 22 the leading striker bar 127 is engaged with the abutment 203 so that the switch is closed and welds will be formed by electrodes A and B. As the switch actuating device rotates, the arm 202 will swing into the broken line or open position until the next striker engages the abutment.

Figure 19:
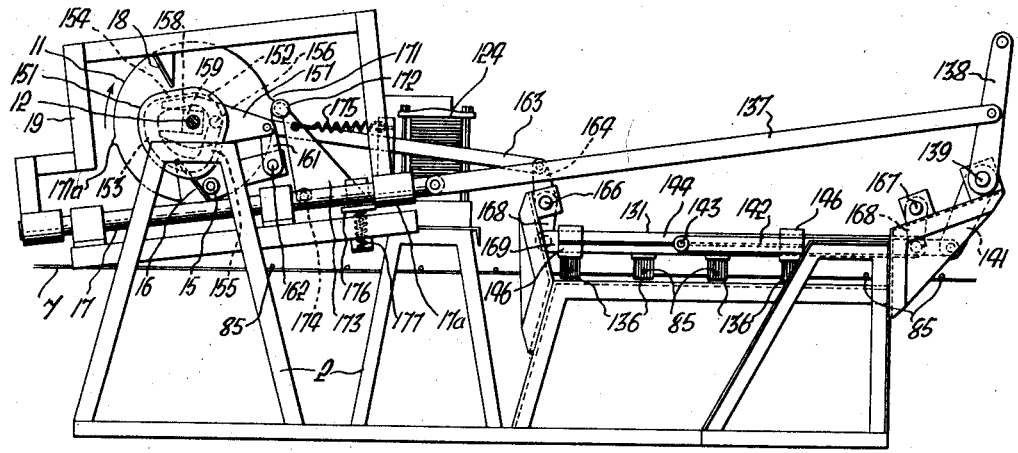
Figure 19 is a side elevation showing means for feeding the longitudinals and for delivering the completed mesh in a flat condition.
Figure 20:
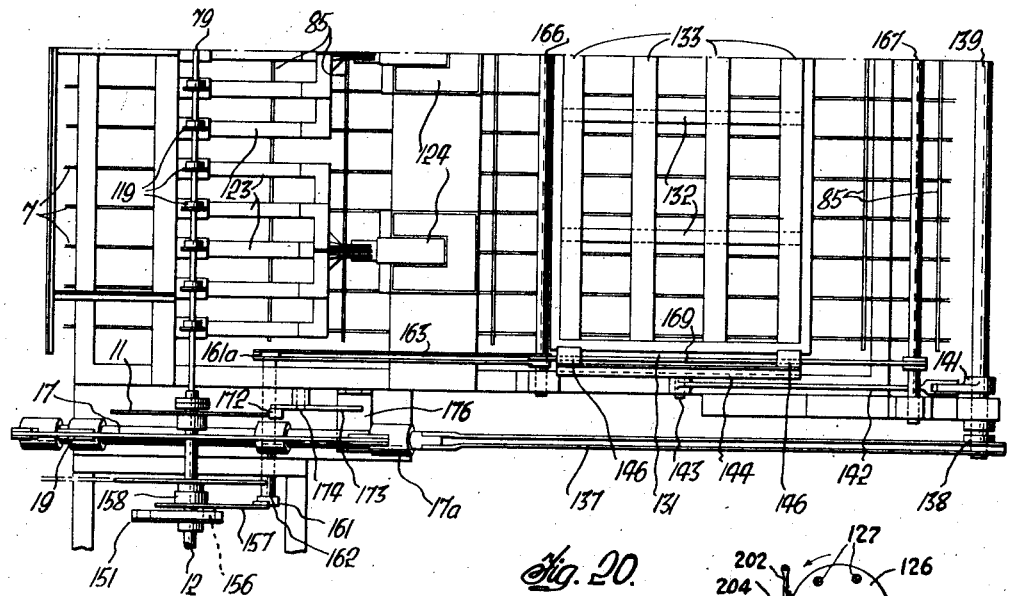
Figure 20 is a half plan of Figure 19.

Instead of coiling the completed mesh around a drum or the like it may be delivered from the machine in flat condition by a modified feed apparatus illustrated in Figures 19 and 20. This apparatus includes a frame 131 having longitudinal and lateral members 132, 133, extending above the completed mesh at the front of the machine and provided with a number of depending grippers such as brushes having preferably metallic bristles 136 through which the longitudinal and lateral members of the mesh extend when the frame is in a lowered position as indicated. There are preferably a number of longitudinally spaced laterally extending rows of such brushes; the spacing between the adjacent rows conforming to the spacing to the laterals 85 of the mesh, each row of brushes being aligned with a lateral member. Means is provided for imparting a substantially rectangular motion to the feed frame whereby it is first moved forwardly with the brushes engaging the mesh, then lifted clear of the mesh, then moved rearwardly while clear of the mesh and then lowered onto the mesh ready for the next forward or feeding stroke.

The means for moving the feed frame backwards and forwards may be similar to the means previously described for intermittently operating the ratchet levers 28 of the drum feeding means, and include disc 11 mounted on shaft 12 and having a crank pin surrounded by a roller 15 co-operating with abutment 16 on sliding shaft 17 and an abutment 18 on yoke 19 attached to the sliding shaft supported by bearings 21. According to Figures 19 and 20, however, the forward end of the sliding shaft is connected by a rod 137 to an arm 138 fixed to and outstanding from a cross shaft 139. This cross shaft may have another arm 141 adjacent each end thereof, each arm 141 being connected by a connecting rod 142 with a gudgeon pin 143 outstanding horizontally from a bar 144 at the side of the frame 131. This bar may be connected to the frame by apertured brackets 146 for a purpose hereinafter apparent.

The means for raising and lowering frame 131 may include a four stage cam member 151 fixed on shaft 12, this cam having an endless race comprising two diametrically opposite quarter-circular portions 152, 153, struck from the same centre but with different radii, joined by two substantially straight intermediate portions 154, 155. Extending into the race of the cam member is a roller 156 carried by a lever 157 which may have a forked end 158 so that it may slide lengthwise of a bearing block 159 capable of oscillation on shaft 12. Lever 157 is connected at its other end to an arm 161 outstanding from a shaft 162. A similar arm 161a may be attached to the other end of shaft 162 and from the outer end of arm 161a extends a connecting rod 163 connected at its front end to arm 164 outstanding from a shaft 166 extending transversely above and at the rear of the frame 131. A companion cross shaft 167 extends transversely above and at the front of the frame and these cross shafts are interconnected at each end by links 168 and a horizontal bar 169. Each bar 169 extends slidably through the apertured brackets 146 applied to the sides of frame 131.

The disc 11 is provided at diametrically opposite positions with projections or strikers 171, 171a, adapted to successively engage a roller 172 at one end of a lever 173 which is pivoted intermediately at 174 and adapted at its other end to engage a catch 176, such as a plate hinged to the framework 2, and extending transversely above or beneath the sliding shaft 17. The hinged catch may be acted upon by a spring 177 to normally hold it against one end face of a collar 17a fast on sliding shaft 17 and to which one end of the yoke 19 is secured. The purpose of the catch 176 and the operating means therefor is to automatically lock and release the sliding shaft at time intervals co-ordinated with the raising and lowering movements of frame 131.

A comparatively light tension spring 175 may be associated with lever 173 to maintain its respective end in contact with catch 176.

In the position of the parts shown in Figures 19 and 20 striker 171 on disc 11 is about to swing lever 173 about its pivot and thus depress hinged catch 176 thereby freeing the sliding shaft 17 for movement in a rearward direction by roller 15 on disc 11 acting against abutment 16 on shaft 17. Rearward movement of the shaft 17 and the connecting rod 137 attached thereto is translated by arm 138, shaft 139, arms 141 and connecting rods 142 into forward movement of frame 131 and consequent forward movement of the mesh. Immediately the forward stroke of the frame has been made the catch 176 engages the front end face of the collar 17a on shaft 17 and prevents movement thereof. During the forward movement of the brush frame, the smaller quarter circular portion 152 of the cam race will move past roller 156 outstanding from lever 157 without effecting any movement of the latter but at the end of the forward stroke of the brush frame, the portion 154 of the cam race acts upon roller 156 and causes lever 157 to move forwardly. This movement is translated by arm 161, shaft 162, arm 161a, connecting rod 163, arm 164, the cross shafts 166, 167, the links 168 and the bars 169 into upward movement of the brush frame so that it is clear of the mesh. The frame is maintained in its raised position by the portion 153 of the cam race negotiating the roller 156 of lever 157 and by this time striker 171a on disc 11 will have actuated lever 173 to depress catch 176 thereby freeing sliding shaft 17 which will be moving forwardly due to roller 15 engaging abutment 18 of yoke 19 so that the raised brush frame will be moving rearwardly. During the next quarter of the revolution of cam 151, lever 157 will be moved rearwardly and thus cause frame 131 to be lowered onto the mesh whereupon the parts will resume the various positions illustrated in Figures 19 and 20 ready for the next forward or feeding stroke of the brush frame.

The mesh may be supported beneath frame 131 by a plurality of bars (not shown) extending longitudinally between the longitudinals 7 so that the laterals 85 rest upon the upper surfaces of said bars.

Adjustment of the stroke of the feed frame to correspond with the spacing of the laterals 85 may be effected by varying the point of attachment of the front end of connecting rod 137 to arm 138.

Having now described my invention what I claim as new and desire to secure by Letters Patent is—

1. Apparatus for the manufacture of wire mesh or the like consisting of longitudinal and lateral members electrically welded together at their junctions; comprising a rigid contact plate extending laterally of the apparatus, means for intermittently advancing the longitudinal members of the mesh over said contact plate, means for successively feeding the lateral members of the mesh forwardly over the longitudinals, means for holding each lateral stationary upon said longitudinals above the contact plate while the longitudinals are at rest, a series of vertically reciprocal plungers disposed above said contact plate and spaced laterally to conform to the spacing of the longitudinals, electrodes carried one at the lower end of each plunger, independent resilient means associated with each plunger to normally maintain it in a raised position, a shaft extending laterally above said plungers, and cams on said shaft for periodically depressing the plungers and electrodes.

2. Apparatus for the manufacture of wire mesh or the like consisting of longitudinal and lateral members electrically welded together at their junctions; comprising a rigid contact plate extending laterally of the apparatus, means for intermittently advancing the longitudinal members of the mesh over said contact plate, means for successively holding the lateral members of the mesh upon said longitudinals above the contact plate while the longitudinals are at rest, a series of vertically reciprocal plungers disposed above said contact plate and spaced laterally to conform to the spacing of the longitudinals, electrodes carried one at the lower end of each plunger, independent springs associated with each plunger to normally maintain it in a raised position, a shaft extending laterally above said plungers, cams on said shaft for periodically depressing the plungers and electrodes, and means operating in timed relationship with said shaft for actuating the longitudinal feeding means.

3. Apparatus according to claim 1 in combination with a cutting device disposed above the longitudinals at one side of the apparatus and rearwardly of said contact plate, means for feeding the lateral wire from a continuous supply past said cutting device, means operatively connected to said cam shaft for periodically actuating said cutting device to sever the wire into predetermined lengths, and means operable with said cutter actuating means for advancing the severed laterals towards said contact plate.

4. Apparatus for the manufacture of wire mesh or the like consisting of longitudinal and lateral members electrically welded together at their junctions; comprising a series of laterally spaced vertical reciprocal welding electrodes, means for intermittently advancing the longitudinal members of the mesh beneath said electrodes, a cutting device disposed above the longitudinals at one side of the apparatus and rearwardly of said electrodes, means for feeding the lateral wire from a continuous supply past said cutting device over the longitudinals, means for periodically actuating said cutting device to sever the lateral wire into predetermined lengths, means operating in timed relationship with the cutting device to direct the severed laterals forwardly onto the longitudinals, means for successively moving each severed lateral along the longitudinals into position beneath said electrodes and for holding each lateral wire in such position during the stationary periods of the longitudinals, and means for depressing said electrodes onto the laterals while the longitudinals are stationary.

5. Apparatus according to claim 4 in combination with a member extending laterally above the longitudinals in alignment with said cutting device to provide a support for the lateral wire, a device actuated in synchronism with said cutting device for moving the cut lateral wire forwardly off said cross member, a ramp for directing the cut lateral wire forwardly and downwardly towards the longitudinals, and means beneath said electrodes for carrying the severed lateral wire forwardly along the longitudinals into the welding position.

6. Apparatus according to claim 4 in combination with a member extending laterally above the longitudinals in alignment with said cutting device to provide a support for the lateral wire, a cross bar of substantially inverted V section normally extending above said lateral member, and means operatively connecting said bar to said cutting device whereby the bar is swung forwards as each length of lateral wire is cut to thereby sweep the cut wire forwardly from said lateral member.

7. Apparatus according to claim 1 wherein the means for feeding the laterals and holding them in welding positions comprises a cross spindle, a number of fingers mounted on said cross spindle and normally extending rearwards of said electrodes, means operatively connected with said cam shaft for periodically turning said spindle so that the fingers swing upwardly and forwardly to engage the rear of each severed lateral and carry it forwardly along the longitudinals to a position above said contact plate, a number of laterally spaced front fingers mounted on a cross spindle and means for yieldingly holding said fingers in position to provide front stops against which each lateral is pressed by said rear fingers.

8. Apparatus according to claim 1, wherein said means for feeding the laterals and holding them in welding positions comprises a number of laterally spaced fingers normally extending rearwards of said contact plate, means operating in timed relationship with said cam shaft for swinging said fingers upwardly and rearwardly so that they engage the rear of each severed lateral and carry it over the longitudinals to a position above said contact plate, and a number of front fingers forming stops against which each lateral is pressed by the rear fingers.

9. In apparatus for the manufacture of wire mesh or the like consisting of longitudinal and lateral members welded together at their junctions by laterally spaced electrodes, means for intermittently advancing the longitudinals and delivering the completed mesh, comprising a rotary drum extending laterally in advance of said electrodes, to which drum the leading ends of the longitudinals are attached, and means for turning said drum comprising a ratchet toothed wheel fast with the drum, a ratchet lever engaging said ratchet wheel and connected to a reciprocating member of constant stroke, and means whereby the effective length of the ratchet lever is increased according to the increase in external diameter of the coil of mesh around the drum.

10. In apparatus for the manufacture of wire mesh or the like consisting of longitudinal and lateral members welded together at their junctions by laterally spaced electrodes, means for intermittently advancing the longitudinals and delivering the completed mesh, comprising a rotary drum extending laterally in advance of said electrodes, to which drum the leading ends of the longitudinals are attached, and means for turning said drum comprising a ratchet toothed wheel fast with the drum, a ratchet lever freely mounted upon a stub axle of the drum, one or more pawls on said ratchet lever engaging said ratchet wheel, a block retained to said ratchet lever, means whereby said block is moved outwardly along said ratchet lever in accordance with the gradual increase in the external diameter of the coil of mesh around the drum, and a reciprocating member of constant stroke connected to said block to thereby swing the ratchet lever to and fro.

11. Apparatus according to claim 10, wherein said block is supported by a spindle which extends longitudinally of the feed drum and carries a roller adapted to engage the periphery of the coil of mesh upon the drum.

12. Apparatus according to claim 10, wherein a ratchet wheel and associated parts are disposed at each end of the drum and operatively connected with said reciprocating member.

13. Apparatus according to claim 10 in combination with one or more holding pawls associated with each ratchet wheel and arranged to prevent reverse turning of said feed drum.

14. Apparatus according to claim 10, characterized in that a series of actuating pawls is carried by said ratchet lever, the pawls being of varying length to thereby minimize lost motion between the ratchet lever and its ratchet wheel.

15. Apparatus according to claim 10, characterized in that each ratchet wheel has a number of longitudinal sections, the teeth of which are staggered circumferentially, each section being engaged by a pawl on said ratchet lever, for the purpose specified.

16. In apparatus for the manufacture of wire mesh or the like consisting of longitudinal and lateral members welded together at their junctions, means for intermittently advancing the longitudinals and for delivering the completed mesh, comprising a frame extending over the completed mesh at the front of the apparatus, said frame having depending feed members such as brushes for engaging the mesh, and means for imparting substantially rectangular motion to said frame whereby it is moved forwards with the feed members engaging the mesh to thereby effect the feeding action, then raised to carry the feed members clear of the mesh, then moved rearwardly while in such raised position, and then lowered to engage the feed members with the mesh ready for the next cycle of operations.

17. Apparatus according to claim 16, wherein said feed members are arranged on said frame in longitudinally spaced laterally extending rows and engage the mesh at the junctions of the longitudinal and lateral members thereof, bars extending longitudinally between the longitudinals of the mesh and through spaces between the brushes of the various lateral rows, in order to support the mesh.

18. Apparatus according to claim 16, wherein means for longitudinally reciprocating said frame comprises a longitudinally reciprocal shaft connected by a rod and an arm with a cross shaft, arms depending from said cross shaft, and connecting rods extending from said depending arms to gudgeon pins outstanding from the sides of the frame.

19. Apparatus according to claim 16, wherein means for raising and lowering the frame comprises a pair of shafts extending laterally at the front and rear of the frame, means for rocking said shafts, links depending from said lateral shafts, bars extending longitudinally one at each side of the frame and connected at their ends to said links, said bars extending slidably through guide lugs or brackets on the sides of the frame.

20. Apparatus according to claim 16 wherein means for raising and lowering said frame comprises a pair of shafts extending laterally at the front and rear of the frame, a four stage cam rotating with said cam shaft, a lever co-operating with said cam so that it is reciprocated once during each rotation of the cam shaft with a pause between its movements in opposite directions, means operatively connecting said lever to said lateral shafts whereby to rock same, links depending from said lateral shafts, bars extending longitudinally one at each side of the frame and connected at their ends to said links, said bars extending slidably through guide lugs or brackets on the sides of the frame.

21. Apparatus according to claim 16, wherein means for longitudinally reciprocating said frame and the means for raising and lowering said frame are operatively interconnected so that the reciprocating means are held inoperative during raising and lowering of the frame and the raising and lowering means are held inoperative during the reciprocating movements of the frame.

22. Apparatus according to claim 1 wherein the means for intermittently advancing the longitudinals comprises a frame extending over the completed mesh at the front of the apparatus, feed members depending from said frame to engage with the mesh, and means operating in timed relationship with said cam shaft for imparting substantially rectangular motion to said frame whereby it is moved forwards with the feed members engaging the mesh to thereby effect the feeding action, then raised to carry the feed members clear of the mesh, then moved rearwardly while in such raised position, and then lowered to engage the feed members with the mesh ready for the next cycle of operations.

23. Apparatus according to claim 1 in combination with a disc turning with said cam shaft, a pin outstanding from said disc, a shaft extending longitudinally below said cam shaft and slidable lengthwise in bearings or guides, a yoke or frame secured to said longitudinal shaft and extending above said cam shaft, abutments on the longitudinal shaft and the yoke disposed respectively below and above said cam shaft and in the path of the pin outstanding from said disc whereby said shaft is reciprocated once during each rotation of said cam shaft, and operative connections between said reciprocatory shaft for actuating said means for intermittently feeding the longitudinal wires.

24. In apparatus for the manufacture of wire mesh or the like consisting of longitudinal and lateral wires or members electrically welded together at their intersections, welding means comprising a series of independently depressible welding electrodes, a stationary contact plate connected into the welding circuit and extending laterally beneath said electrodes to support the crossed wires at the welding zones, a transformer having opposite sides of its secondary connected to alternately spaced electrodes so that a current potential exists between each adjacent pair of electrodes, means for selectively depressing said electrodes so that an adjacent pair thereof contacts simultaneously with the crossed wires, a switch connected into the welding circuit, and switch actuating means operating in timed relationship with said electrode depressing means whereby the switch is closed only when two of the electrodes are in contact with the crossed wires.

25. In apparatus for the manufacture of wire mesh or the like consisting of longitudinal and lateral wires or members electrically welded together at their intersections, welding means as claimed in claim 24, wherein spring means is provided to automatically return said electrodes to non-welding positions after each welding action, and said electrode depressing means is adapted at the completion of each weld to release one of the pairs of depressed electrodes, to maintain the other depressed electrode in contact with the crossed wires at the last formed weld and to depress the next electrode preparatory to forming the succeeding weld.

26. Apparatus for the manufacture of wire mesh or the like consisting of longitudinal and lateral members electrically welded together at their junctions; comprising a series of laterally spaced vertically reciprocal welding electrodes, a rigid contact plate extending laterally beneath said electrodes, means for intermittently advancing longitudinal members of the mesh over said contact plate, means for positioning lateral members of the mesh upon said longitudinals above said contact plate while the longitudinals are at rest, said positioning means for the laterals comprising a number of laterally spaced fingers normally extending rearwards of said contact plate, means for swinging said fingers upwardly and forwardly so that they engage the rear of each severed lateral and carry it forwardly along the longitudinals to a position above said contact plate, and a number of front fingers adapted to project over said contact plate to form stops against which each lateral is held by said rear fingers.

27. Apparatus for the manufacture of wire mesh or the like consisting of longitudinal and lateral members electrically welded together at their junctions; comprising a series of laterally spaced vertically reciprocal welding electrodes, a rigid contact plate extending laterally beneath said electrodes, means for intermittently advancing longitudinal members of the mesh over said contact plate, means for positioning lateral members of the mesh upon said longitudinals above said contact plate while the longitudinals are at rest, said positioning means for the laterals comprising a number of fingers disposed between adjacent longitudinals and normally extending rearwards of said contact plate, means for swinging said fingers upwardly and forwardly so that they engage the rear of each severed lateral and carry it forwardly along the longitudinals to a position above said contact plate, a number of front fingers adapted to project over said contact plate to form stops against which each lateral is held by said rear fingers, said rear and front fingers being provided with stepped faces adapted when in their wire holding positions to engage the rear and front edges of said contact plate.

In testimony whereof I affix my signature.

CLAUDE COSGROVE.